(12) United States Patent
Di Domenico et al.

(10) Patent No.: US 8,242,912 B2
(45) Date of Patent: Aug. 14, 2012

(54) METHOD AND DEVICE FOR DETERMINING OF AN ORDER OF CONVEYED OBJECTS

(75) Inventors: Mauro Di Domenico, Bironico (CH); Christian Narvaez, Purasca (CH); Dan Butch, Edinburg, PA (US); Peter Stegmaier, Ponte Capriasca (CH); Flavio Bizzozero, Comano (CH)

(73) Assignee: Datamars SA (CH)

( * ) Notice: Subject to any disclaimer, the term of this patent is extended or adjusted under 35 U.S.C. 154(b) by 450 days.

(21) Appl. No.: 12/479,015

(22) Filed: Jun. 5, 2009

(65) Prior Publication Data

US 2009/0303048 A1    Dec. 10, 2009

(30) Foreign Application Priority Data

Jun. 6, 2008   (EP) ..................................... 08104305

(51) Int. Cl.
*G08B 13/14*   (2006.01)
(52) U.S. Cl. ................. 340/572.4; 340/572.1; 340/10.1; 340/10.3
(58) Field of Classification Search ............... 340/572.1, 340/572.4, 10.1, 10.3, 10.5
See application file for complete search history.

(56) References Cited

U.S. PATENT DOCUMENTS

| | | | |
|---|---|---|---|
| 2007/0229272 A1* | 10/2007 | Cash et al. | 340/572.1 |
| 2007/0279195 A1 | 12/2007 | Littlechild et al. | |
| 2008/0007410 A1* | 1/2008 | Rosenbaum et al. | 340/572.1 |

* cited by examiner

*Primary Examiner* — Brent Swarthout
*Assistant Examiner* — Hongmin Fan
(74) *Attorney, Agent, or Firm* — Muncy, Geissler, Olds & Lowe, PLLC

(57) ABSTRACT

The invention relates to a method for determining of at least an order of objects O1,O2 transported by a conveyor 1 along a conveyor path 2, wherein each of the objects O1,O2 carries an assigned transponder T1,T2 having a characterizing code. At least a first radio frequency identification reader R1—having at least a first reader-antenna A1 for generating a first reading field F1—is arranged with respect to the conveyor 1 and built for identifying the transponders T1,T2 of the transported objects O1,O2 passing along or through the first reading field F1.

The following steps are performed: reading out the codes of the transponders T1,T2 by the first reader R1 and generating detection-signals as long as the respective transponder T1,T2 is detectable by the first reader R1, saving the detection-signals linked with a time information, deriving a mean first point of time for each detected transponder T1,T2 from the saved detection-signals and the time information linked therewith by an assessment method—wherein the first points of time indicate an estimated discrete point of time for each transponder of passing the first reader R1—and determining the order of the objects O1,O2 on the conveyor 1 according to the first points of time of each transponder T1,T2.

18 Claims, 5 Drawing Sheets

METHOD AND DEVICE FOR DETERMINING OF AN ORDER OF CONVEYED OBJECTS

This application claims priority to European Patent Application No. 08104305.1, which was filed in the EPO on Jun. 6, 2008, and which is herein incorporated by reference.

The invention relates to methods for determining of an order of conveyed objects, more particularly to objects carrying assigned transponders having a characterizing code, and to devices for determination of an order of conveyed objects.

Miniature radio frequency transponders are known to be useful for example for identification, information storage, access control, security and validation, as well as for comparable other purposes.

Especially in connection with conveyed objects travelling along a conveyor path, transponders are used for identification of the objects and determination of an order thereof. Therefore, radio frequency identification (RFID) reader antennas are placed with respect to the conveying path so that the codes of the transponders—passing the reading antenna and its reading field—can be read out. Exemplary in the laundry industry, it is important to know the correct order of conveyed garments—for example in order to enable a correct sorting thereof.

Most RFID transponders include an electro-magnetic, magnetic or electrical antenna, for example consisting of a ferrite rod surrounded by a coil, electrically connected to an integrated circuit which, in response to received transmitted energy obtained from the antenna, generates a response signal which is retransmitted to and through the antenna to a nearby RFID reader. In other words, the integrated circuit is coupled to an electromagnetic, magnetic or electrical antenna, which enables the transponder to receive and utilize incident electromagnetic, magnetic or electrical wave energy for power as well as information and to retransmit response signals. Initially, an RFID reader antenna directs an electromagnetic, magnetic or electrical field towards the implanted transponder. After being energized, the transponder device sends back the identification information—usually a code—to the reader, thus enabling identification of the transponder and, consequently, the object carrying the transponder. In this way, the conveyed objects can be identified and recognized individually.

Dependant of the orientation of the transponder with respect to the reader antenna and the generated reading field, the reading window—that means the detection range wherein the transponder can be read out by the RFID reader can vary.

Therefore, dependent on the conveyor speed, the distance between the conveyed objects and the spatial orientation of the transponders, several transponders carried by the objects may be detected simultaneously by the RFID reader. Hence, it may happen that the transponder of a second object—being ordered behind a first object in the conveying direction on the conveyor—is detected by the reader before the transponder of the first object. According to most RFID reading devices for conveyors of the state of the art, this may lead to a wrong determination of the order of conveyed objects.

It is therefore an object of the present invention to provide an improved method and device for determining the order of conveyed objects carrying RFID transponders using an RFID reader. Particularly, the order of the conveyed objects should be determined with higher success probability, even if several transponders are detected simultaneously.

A further object is to provide a determination of the conveyor position of the transported objects with higher accuracy.

Those objects are achieved by realising the features of the independent claims. Features which further develop the invention in an alternative or advantageous manner are described in the dependent patent claims.

According to the invention, not only the readout-signal of the transponders while entering into the reading window of the RFID reader is considered for determining the order of the transponders—respectively the objects carrying the transponders—but also a correlation between the generated transponder readout-signals and the movement of the conveyed objects carrying the transponders is taken into consideration for deriving the order thereof. Therefore, additional information—for instance on the detection range of each transponder, which may be dependant on the orientation of the transponder relative to the reading field, and/or the movement of the conveyor during readout—as well as multiple reading stations can be used to enhance this correlation.

In general, the invention relates to a method for determining of at least an order of transported objects by a conveyor along a conveyor path. Each of the objects—which has to be identified and ordered—carries an assigned RFID transponder having a characterizing code. At least a first RFID reader—having at least a first reader-antenna for generating a first reading field—is designed for identifying the transponders of the transported objects passing along or through the first reading field. An appropriate RFID reader—for generating detection-signals as long as a transponder is within its detection range—is well known for a skilled person and may be arranged with respect to the conveyor, so that the carried transponders travelling along the conveying path can be detected.

According to the invention, the codes of the transponders are read out by the first reader and are generated as long as the respective transponder is detectable by the first reader, particularly with constant read-out rate. That means, as long as each transponder is within the detection range or reading window of the first reader, the transponder sends back signals to the first reader, especially with the code information of each transponder. The responsive signals of each transponder are detected by the RFID reader and linked with a time information. The so generated detection-signals are saved chained together with the time information.

These saved detection-signals—and the time information chained together therewith—are considered for deriving a mean first point of time for each detected transponder—wherein said point of time indicates an estimated discrete point of time for each transponder of passing the first RFID reader. Therefore, an assessment or averaging method for calculating the mean point of time of the time-dependant detection-signals is performed.

That means, each transponder travelling through the reading field is identified and—for each transponder—an averaged point of time is derived. These mean points of time of the generated detection-signals for each transponder are used for determining the order of the objects on the conveyor carrying the transponders.

Thus, not only the entering points of time—when the transponders enter the detection window of the reader—are decisive for the order of the objects, but also a calculated mean point of time being derived from the detection-signals generated as long as the transponder is conveyed through the detection range.

For instance, the mean point of time of each transponder can be calculated as the center of the time interval between entering into and the exiting out of the detection window of the RFID reader. Therefore, the assessment method is performed by determining an entering time and a leaving time of the detection range for each transponder using the saved detection-signals and calculating the arithmetic average of the entering and the leaving times as the first point of time.

Thus, the invention enables an appropriate determination of an object-order also in case that more than one transponder is detected simultaneously by the first RFID reader. Hence, this method allows a higher success probability, a higher conveyor speed and/or a denser placement of the objects on the conveyor.

In a preferred embodiment, the detection-signals are generated with constant or variable reading-rate, for example with a reading rate being dependant on the conveyor velocity.

Furthermore, the actual conveyor velocity can be assigned to each detection-signal, so that additional information regarding the movement of each transponder while travelling through the reading window can be considered for determining the object-order. The conveyor velocity can be known or—for example—be measured by a velocity sensor, especially by at least one of the following velocity sensors:

a sensor connected to a driving unit of the conveyor,
a photoelectric beam detector,
a trailing wheel connected to the conveyor,
a laser velocity sensor and/or
a radar velocity sensor.

In case of saving the detection-signals chained together also with the actual conveyor velocity, the assessment method can—for instance—be performed by weighting the detection times of the detection-signals with the corresponding conveying-velocity and calculating a weighted mean point of time as the first point of time for each transponder.

As a further possible assessment method, a travelling distance of each transponder through the first reading field can be derived from the saved detection-signals and the conveying-velocity linked therewith. Then, that point of time can be determined as mean first point of time, when the transponder passed the half of the travelling distance through the detection window. According to this approach, also a stop of the conveyor causing a transponder dwelling or remaining within the detection range, would not lead to an inappropriate calculated mean point of time for passing the reader and, hence, enables a correct determination of the order.

It is also possible according to the invention to use multiple different assessment methods for deriving multiple first points of time and selecting the most appropriate first point of time for each transponder for determining the order, in particular by using a maximum likelihood approach, especially by using knowledge of a type of the objects carrying the transponders as this influences the spatial orientation of the transponders relative to the first reader antenna and thus the reading window.

Preferable, also positions of the objects on the conveyor path are derived from the calculated first points of time.

In a further embodiment, the first reading field is confined by shielding areas on the conveyor path before and/or behind the first reader-antenna—in particular by means of a metallic and/or ferrite material for magnetic fields and dielectric materials for electric fields.

In a further embodiment, a second radio frequency identification reader—having a second reader-antenna for generating a second reading field—can be arranged for reading out the codes of the transponders transported through the second reading field. Particularly, the second antenna is arranged on a second position of the conveyor path and parallel with respect to the first reader-antenna, so that—in this case—the first and the second reading fields have substantially the same orientations. Furthermore, the first and second readers can be synchronized with respect to their reading fields.

Hence, additional detection-signals can be also generated by the second reader as long as the respective transponders are detectable by the second reader. The additional detection-signals can also be saved chained together with a time information and, thus, can also be used for determining the order of the conveyed objects.

For example, a mean second point of time can also be derived for each detected transponder from the respective additional detection-signals of the second reader, so that the order of the objects can be determined with even higher accuracy by using the first and the second points of time. Particularly, the order can be determined using an average of the first and the second points of time of each transponder.

Thereby, the orientation of the objects before the first and/or the second reader can be manipulated. For example, in case of a conveyor having hooks for attaching garments which carry transponders, a manipulating stick can be placed before the first and/or the second RFID reader in order to touch the passing garments, so that the travelling garments knock on the manipulating stick, get stuck for a moment and, thus, change their spatial orientation. Hence, different orientations of the transponder relative to the first reader and relative to the second reader can be generated, which allows two independent analyses by the first and the second reader with different transponder orientations.

Another approach to allow two independent analyses of the read-out of the transponders is to arrange the second reader-antenna tilted with respect to the first reader-antenna so that the orientations of the first and the second reading fields are different.

One possibility for considering the detection-signals of both the first and second reader is to derive an order according to the transponder-detection-signals of the first reader and to re-assess this order according to the generated transponder-detection-signals by the second reader. Alternatively, the detection signals generated by the first and second readers for each transponder can be used together for calculating the order. Therefore, an averaging method—as described before—for deriving a mean point of time from the detection-signals of both the first and the second reader can be used, wherein these mean points of time for each transponder can represent the decisive parameter for determining the order of the objects.

In many fields of use, conveyors comprise hooks or slots for mounting the objects to be transported. Then, the objects are only placed on these fixed predetermined—particularly equidistant—hooks or slots of the conveyor. According to another approach of the invention, this information of the predetermined places for attaching the objects can be used for enhancing the determination of the exact positions of the objects on the conveyor.

Particularly, according to the generated detection-signals for each transponder, each object can be assigned to one hook or slot with the highest likelihood. For example, that hook or slot can be chosen which is next to the position calculated from the detection-signals. Thus, each conveyed object can be allocated to a hook or slot. This allocation information then can be provided to a further system for processing of the objects, especially to a sorting machine or the like.

For performing the calculation of the order and/or the positions of the objects on the conveyor, a computing unit being connected to the first and/or second reader can be used. Then, the computing unit, which can also be integrated into the reader, is designed for saving the detection-signals linked with a time information. From these saved detection-signals and the time information linked therewith, the computing unit derives a mean first point of time for each detected transponder by an assessment method, wherein the first point of time indicates an estimated discrete point of time for each transponder of passing the first reader. According to the invention, the whole detecting time of each transponder while being conveyed through the reading field—and particularly also a conveying speed while travelling through the reading field—is considered.

Hence, the order of the objects can be determined by the computing unit according to the derived mean points of time of each transponder.

The computing unit—especially a personal computer or the like—can be programmed for performing all above mentioned methods for calculating the order and/or the positions of the objects on the conveyor path.

The computing unit can be formed in a decentralised way and may comprise two computing parts, one thereof being assigned to the first reader and the other being assigned to the second reader.

Alternatively, the computing unit can be formed as a centralized computer being connected with the first and—in case of an arrangement of two readers—also the second reader.

Furthermore, the controller of the conveyor velocity and/or the sensors for measuring the conveyor velocity can be connected to the computing unit, so that the computer can link the detection-signals with the actual conveyor velocity information and, thus, can consider all provided information for calculating the order and the positions of the objects on the conveyor.

To be identified the transponders pass trough a reading volume, generated by an RFID reader/antenna. Such window may contain one or more transponders.

The following problems can now be solved by the inventive method and inventive device:
- variable conveyor speed and stopped conveyor
- variable placement-distance between the objects
- absence of an object, e.g. a free hook or slot
- different detection window length for every transponder (depending on the transponders' spatial angle or orientation, the location of the transponder on the object, an antenna coupling factor, an antenna quality factor, etc.)

The invention will be explained in greater detail below with reference to examples of possible embodiments shown schematically in the drawings, in which.

The principles of the embodiments described herein show the structure and operation of several examples used to illustrate the present invention. It should be understood that the drawings are diagrammatic and schematic representations of such example embodiments and, accordingly, are not limiting the scope of the present invention, nor are the drawings necessarily drawn to scale.

Figure 1:
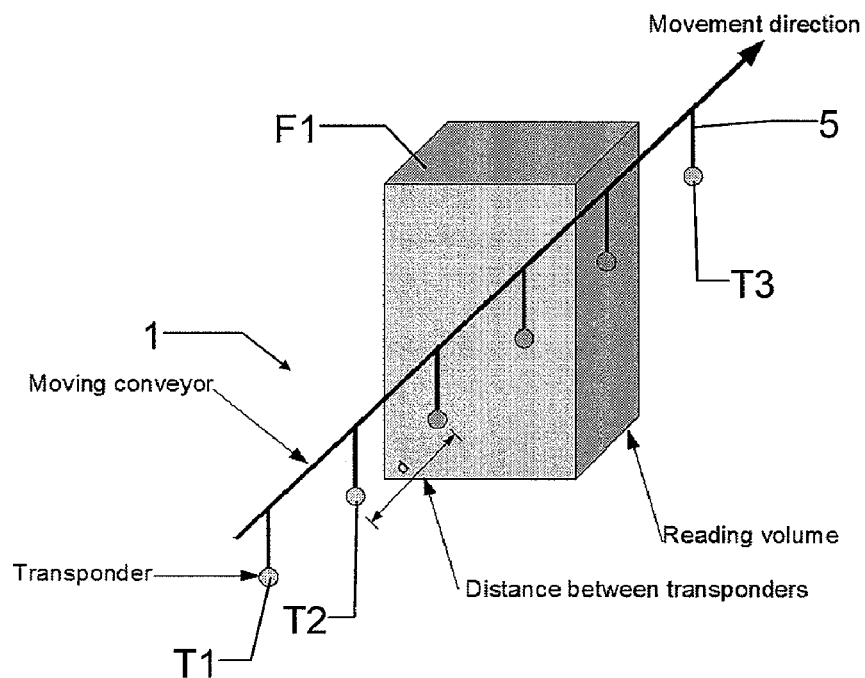
FIG. 1 shows an example for a conveyor with hooks for transporting objects, wherein an RFID reader is arranged for reading out the codes of transponders being carried by the conveyed objects.

FIG. 1 shows an example for a conveyor 1 with predetermined places 5—e.g. hooks—for transporting objects, wherein an RFID reader is arranged for reading out the codes of the transponders T1,T2,T3 being carried by the conveyed objects, wherein an individual detection range—or reading volume/window—of each transponder T1,T2,T3 is at least dependant on its orientation relative to the first reading field F1. The hooks of the conveyor are mounted equidistant. The conveyor 1 is moving in a predetermined moving direction with a given conveyor speed.

Figure 2:
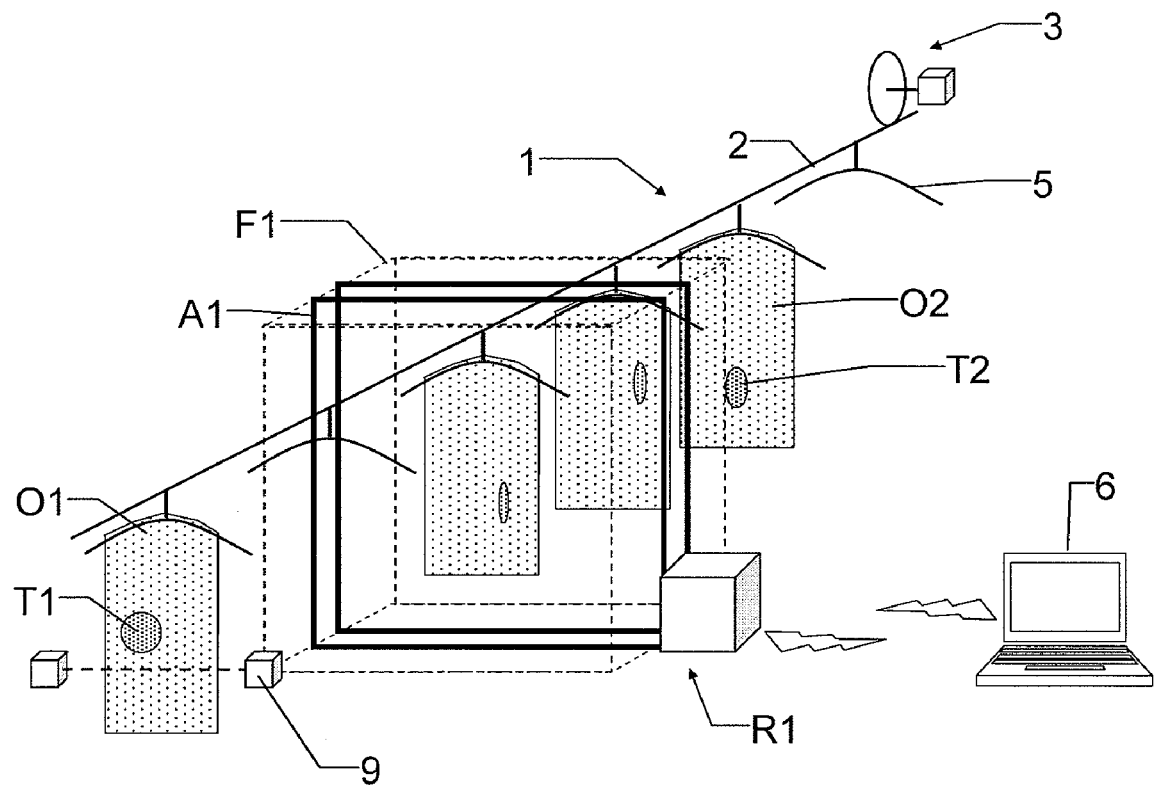
FIG. 2 shows another example for a laundry conveyor with hooks for transporting garments, wherein an RFID reader is arranged for reading out the codes of transponders being carried by the garments.

FIG. 2 shows an example for a laundry conveyor 1 with hooks as predetermined places 5 for transporting garments O1,O2, wherein an RFID reader R1—having an antenna A1 comprising two loops—is arranged for reading out the codes of transponders T1,T2 being carried by the garments O1,O2.

Therefore, the RFID reader R1 is designed for generating a first reading field F1 and for receiving responsive signals from the transponders T1,T2, so that the transponders T1,T2 of the transported objects O1,O2 passing through the first reading field F1 can be identified.

The responsive signals being emitted by the transponders T1,T2 are detected by the RFID reader R1 and detection-signals are generated as long as the respective transponder T1,T2 is detectable. Thereby, each transponder T1,T2 is detectable within an individual detection range (reading window) which is at least dependant on its spatial orientation relative to the reading field F1.

The system further comprises a computing unit 6 formed for saving the detection-signals linked with a time information. According to the invention, a mean point of time for each detected transponder T1,T2 is derived from the saved detection-signals and the time information linked therewith by an assessment method, wherein the first point of time indicates an estimated discrete point of time for each transponder T1,T2 of passing the first reader.

These derived mean points of time for each transponder T1,T2 are used as decisive parameter for determining the order of the objects O1,O2.

Furthermore, a velocity sensor 3 for measuring and providing an actual conveyor velocity is arranged. Exemplary a trailing wheel connected to the conveyor is shown as one possible embodiment of the velocity sensor 3. Of course, all other appropriate velocity sensors for measuring an actual conveying speed can be used, for example a sensor connected to a driving unit of the conveyor, a photoelectric beam detector, a laser velocity sensor, a radar velocity sensor, etc.

Therefore, the knowledge about the movement of the conveyor 1 can be used for determining the order of the objects O2,O2 transported through the reading field F1.

For example, the velocity sensor 3—being also connected to the computing unit 6—sends the actual speed information to the computing unit 6, so that the detection-signals can be saved chained together also with the actual conveyor speed—besides the time information of receiving the responsive transponder signals. Hence, also the actual conveyor speed can be considered for deriving the mean points of time from the detection-signals.

In a further embodiment, the measured actual velocity is transmitted also to the RFID reader R1, which allows a control of the reading rate dependant on the conveyor velocity, so that the detection-signals can be read out and generated with a variable rate being dependant on the conveyor speed.

In a further approach, a known artificial disturbance of the physical, spatial orientation of the objects O1,O2 carrying the transponders T1,T2 relative to the RFID reader R1 can be introduced—for example in order to optimize reading parameters.

Furthermore, a field entry counter can be integrated into the transponders T1,T2. This allows providing information—particularly in conjunction with the conveyor speed—about the traveled distance from a field entry into the reading field F1 to a first read (first generated detection-signal), so that information about non-monotonous movement of the objects can be recognized and considered (e.g. bouncing of the transported objects O1,O2).

The transponders T1,T2 can also be designed with a quiet storage bit, which allows keeping a transponder T1,T2 switched off even when exiting the field F1 for a short amount of time before re-entering the field F1.

Additional information can further be given by a beam interruption detector 9 detecting the presence of an object on the respective conveyor hook and/or a pulse generator coupled with the conveyor motor, in order to determine the position of each potential transponder T1,T2. With this information the system can assign with more accuracy individual transponder codes to every conveyor-hook position. Furthermore, by using two beam interruption detectors arranged very close to each other and not parallel among them, the accuracy of very close objects attached to the conveyor 1 can be increased.

Figure 3:
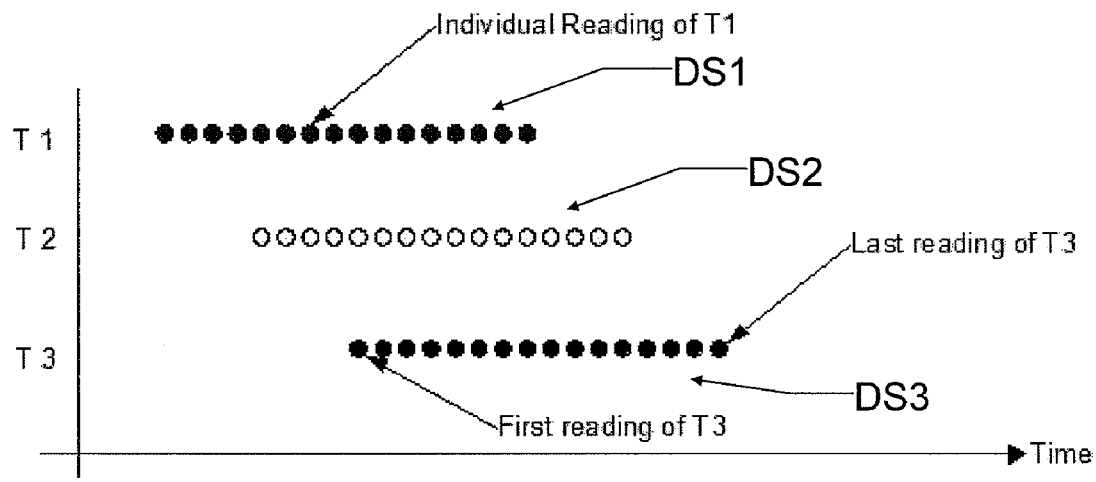
FIG. 3 shows generated detection-signals under ideal conditions and constant physical orientation of the transponders.

FIG. 3 shows generated detection-signals DS1,DS2 under ideal conditions and constant physical orientation of the transponders T1,T2.

Assuming—for simplicity—that transponders T1,T2 have the same minimum activation magnetic field, a constant physical orientation and constant distance between them, the shown graph represents the readings of three transponders T1,T2 attached to a conveyor.

It is possible to use the position in time of the readings of each tag to determine the physical position of any single transponder (relative to the others). In this specific case the position of the first read of the three transponders T1,T2 would be sufficient.

However, not all transponders necessarily enter the magnetic field with the same physical orientation and this orientation may change as they travel across the field. Thus, in practical applications, the orientation of the conveyed objects and the orientation of the transponders carried by the objects are neither the same nor constant.

Therefore, it may happen that the transponder of a second object—actually ordered behind a first object in the conveying direction on the conveyor—will be detected by the reader before the transponder of the first object. According to a method, wherein the order is determined using the first read signal of each transponder, this would lead to a wrong determination of the order of the conveyed first and second objects.

Figure 4:
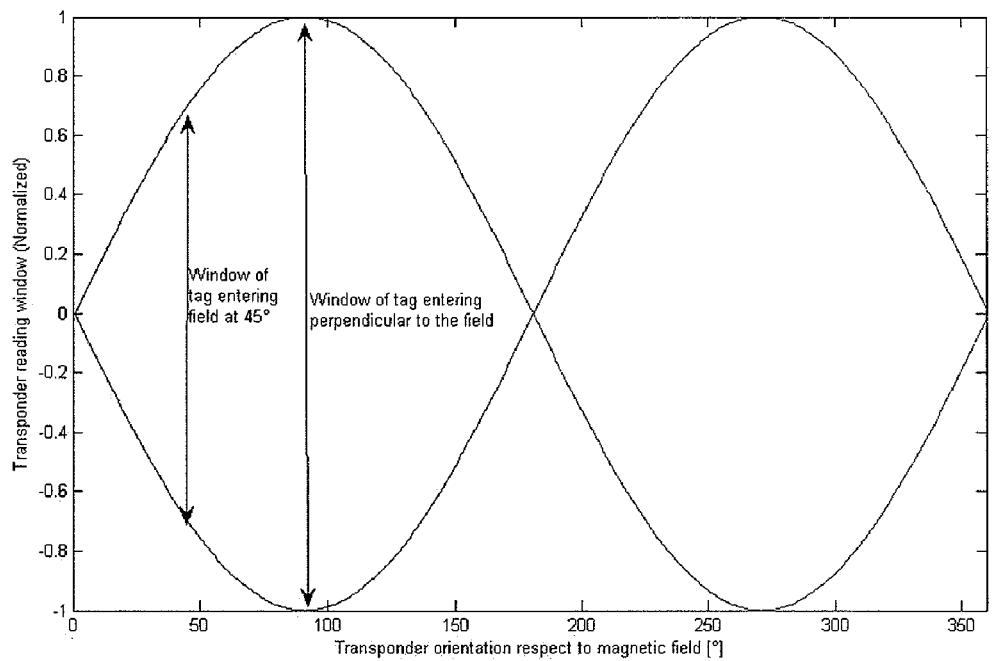
FIG. 4 shows a diagram of the detection range of a transponder dependent on its orientation relative to the reading field.

FIG. 4 shows the normalized detection window length as function of the vertical orientation of the transponder with respect to the reading field.

Figure 5:
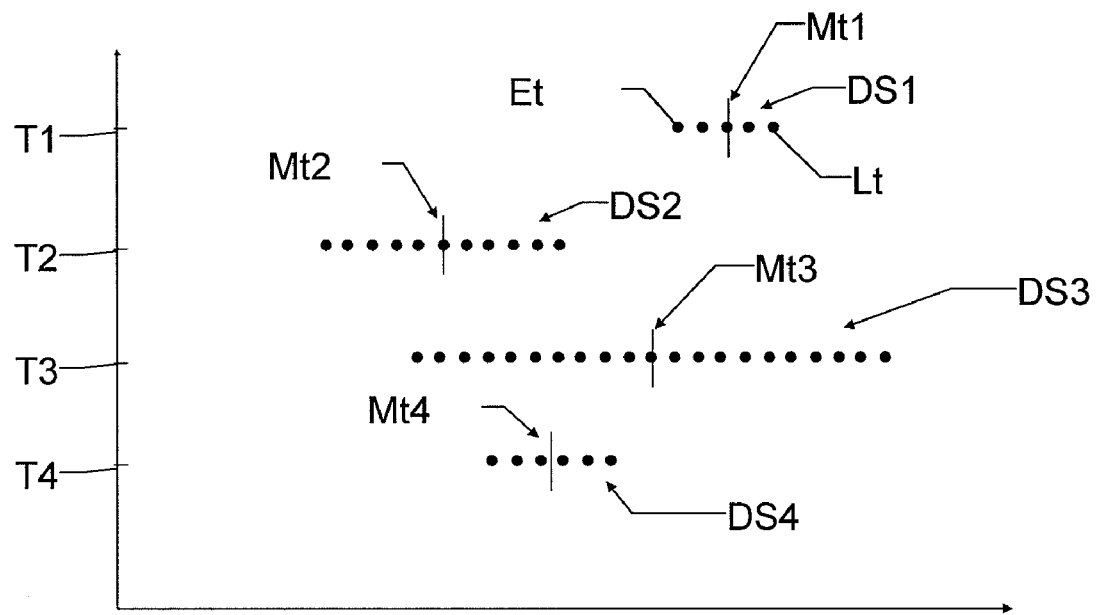
FIG. 5 shows generated detection-signals with varying spatial orientation of the transponders and the derived mean points of time for each transponder.

FIG. 5 shows the time-dependant detection-signals DS1, DS2,DS3,DS4 generated by the RFID reader, wherein four objects—each carrying a transponder T1,T2,T3,T4—successively traveled through the reading field of the reader—with different spatial orientations of the trans-ponders T1,T2,T3, T4.

Even tough transponder T2 was seen before transponder T1, the symmetries of the traces of the detection-signals DS1,DS2 show that transponder T1 is physically positioned before transponder T2 on the conveyor.

According to the invention, the order of the detected transponders T1,T2,T3,T4 is derived and calculated using an assessment method. For example, the assessment method is performed by determining an entering time Et and a leaving time Lt of the detection range for each transponder T1,T2,T3, T4 using the saved detection-signals DS1,DS2,DS3,DS4 and calculating the arithmetic average of the entering and the leaving times Et,Lt as the mean points of time Mt1,Mt2,Mt3, Mt4. The order then can be determined according to the derived mean points of time Mt1,Mt2,Mt3,Mt4.

The graph in FIG. 5 shows a constant distribution of the individual readings. However, it is possible that the reader fails to read with such a constant distribution, due to the critical orientation angle of the transponder, noise, etc. In such cases, another parameter to consider for the calculations of the order is the density of the readings within a trace.

An additional parameter that can be considered for the calculation of the order and the conveyor positions of the objects is the difference in energy that the transponders reflect to the reader while passing the reading field.

The main purpose of the system is to guarantee the exact order of the transponders on the conveyor, therefore, in some cases it might even be worth to ignore a transponder (and consider it as not read) if there is the doubt that it can be assigned to an incorrect position. For example, the system can determine if there is a risk of faulty assignment of a transponder to the wrong conveyor position by considering the total number of read (detection-signals) per trace, the density of readings in a trace of the detection-signals, the symmetry of the trace of the detection-signals, etc.

In a further embodiment, the device according to the invention can be tuned for different degrees of security. Thus, dependent on a predeterminable degree of reliability for the determination of the order of the objects, the conveyor speed can be adjusted.

Figure 6:
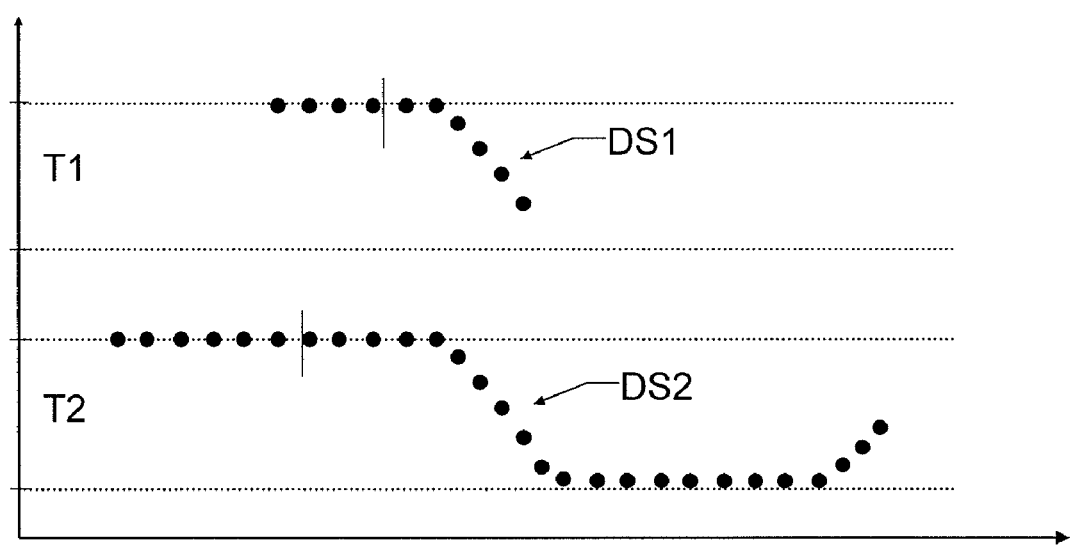
FIG. 6 shows generated detection-signals chained together with conveyor velocity information.

FIG. 6 shows a graph of generated detection-signals DS1, DS2 chained together with conveyor velocity as a function of the read-out time.

The time-dependant detection-signals DS1,DS2 are generated by the RFID reader, wherein exemplarily two objects—each carrying a transponder T1,T2—successively traveled through the reading field of the reader—with different spatial orientations of the transponders T1,T2. While the transponders T1,T2 has been passing through the reading field, the conveyor has been stopped for a moment by a user—for example in order to attach or remove a further object to respectively from the conveyor.

According to a preferred embodiment of the invention, also the conveyor speed is considered for determining the order and positions of the conveyed objects.

Therefore, the actual conveyor velocity is assigned to each detection-signal. The conveying-velocity linked with the detection-signals DS1,DS2 can now be considered for deriving the mean point of time for each transponders T1,T2 from the respective detection-signals DS1,DS2.

In particular, the assessment method for deriving the mean points of time can be performed by weighting each time information of the detection-signals DS1,DS2 with the corresponding conveying-velocity and calculating a weighted mean point of time for each transponder.

Alternatively, the assessment method can also be performed by deriving a travelling distance of each transponder through the first reading field from the saved detection-signals DS1,DS2 and the conveying-velocity linked therewith and deriving that point of time as the mean point of time when the transponder passed the half of the travelling distance through the reading window.

Figure 7:
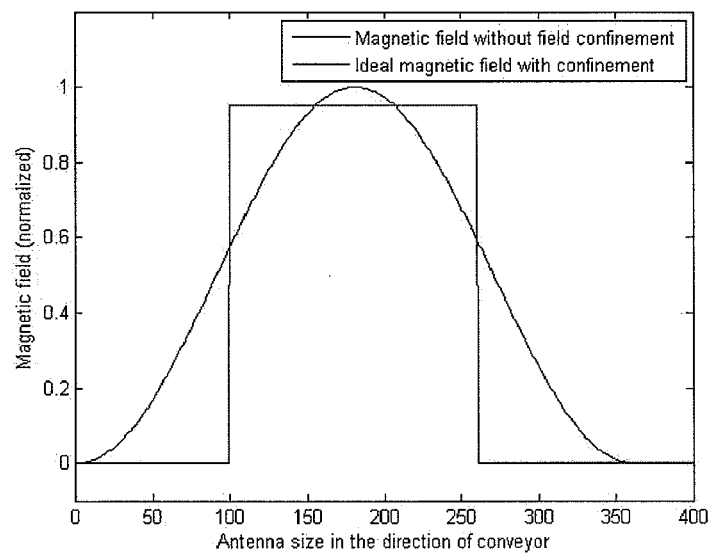
FIG. 7 shows a diagram of the reading field with and without field-confinement.

FIG. 7 shows a diagram of the reading field with and without field-confinement.

In order to guarantee a good quality of the traces of the detection-signals it is necessary to have a strong reading field confined in a small space.

Therefore, according to another aspect of the invention, the reading field can be confined by shielding areas on the conveyor path before and behind the reader-antenna of the RFID reader.

According to the shielding and the therefore generated strong reading field confined in a small space, the individual reading window of each transponder is fewer dependent on the orientation of the transponders, so that the read-outs are less influenced by the spatial orientations of the conveyed objects respectively of the transponders on the objects.

Figure 8:
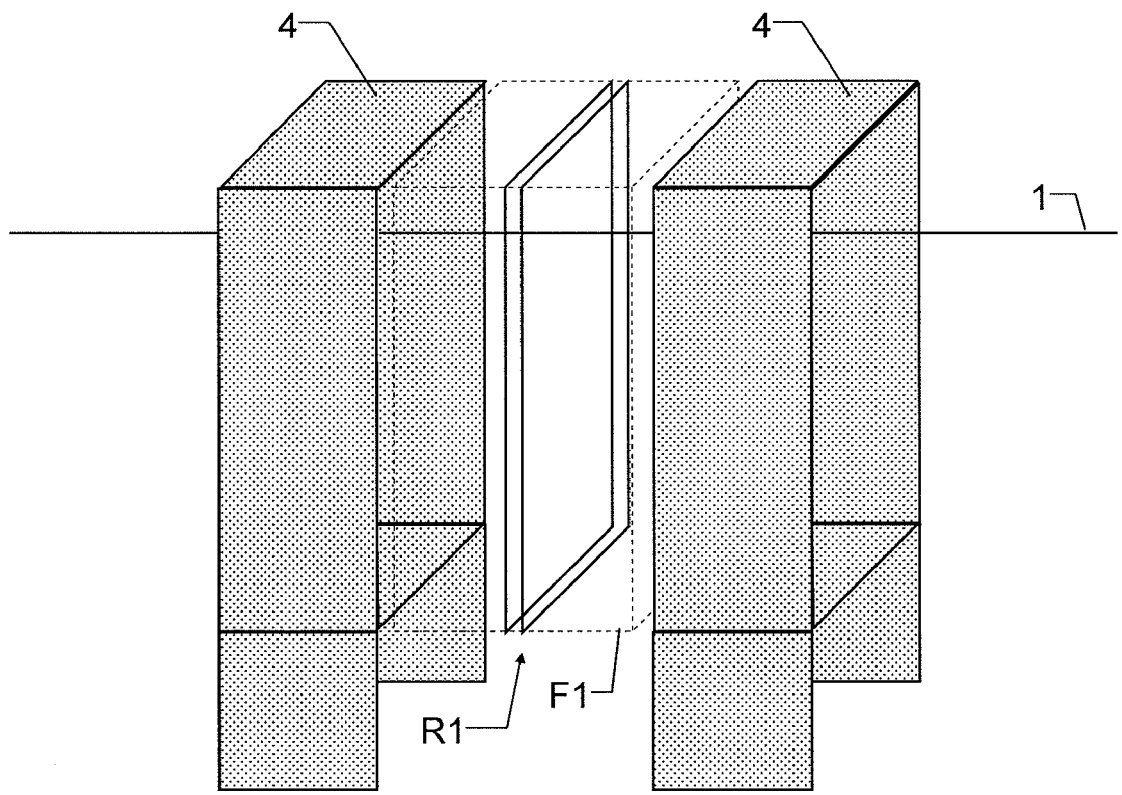
FIG. 8 shows an RFID reader with shielding before and behind the RFID reader in order to confine the reading field.

FIG. 8 shows exemplary an RFID reader arranged on the conveyor path with shielding 4 before and behind the RFID reader R1, wherein the shielding 4 confines the reading field F1 as shown in the diagram of FIG. 7. Particularly, the shielding 4 can be achieved by means of a metallic and/or ferrite material for magnetic fields and dielectric materials for electric fields.

The accuracy of the system can further be increased by applying multiple reading stations along the conveyor path so that the objects are transported through a number of RFID fields.

Figure 9:
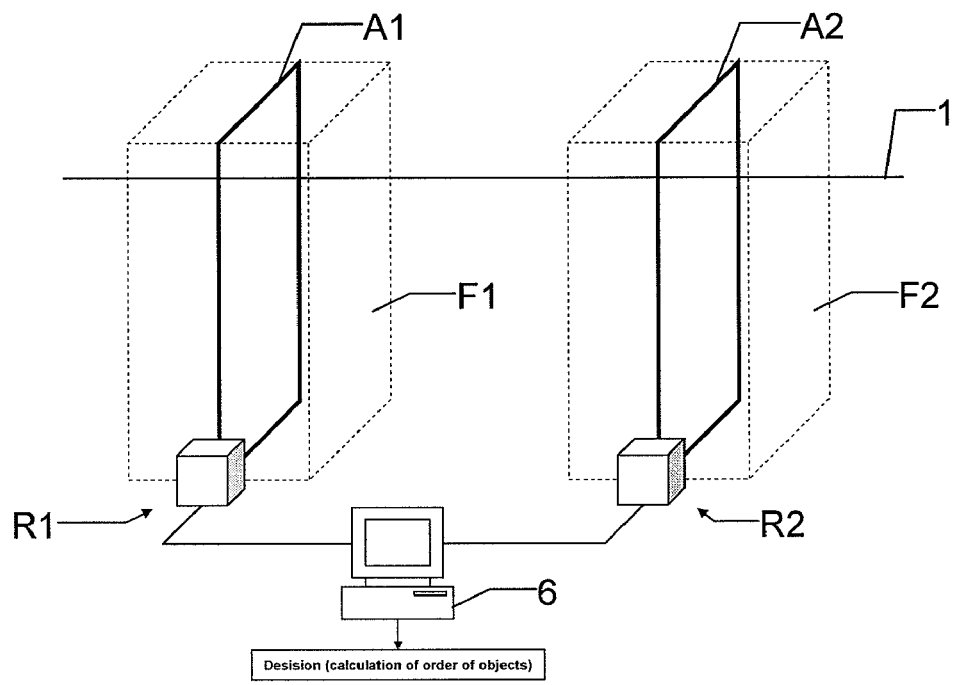
FIG. 9 shows a parallel configuration of the first and second reader with a central computing unit.

Therefore, FIG. 9 shows a configuration of two RFID readers—a first R1 and a second R2 one—arranged on the conveyor path. The first and the second reader R1,R2 are connected to a central computing unit 6. In the shown embodiment, the second reader-antenna is arranged parallel with respect to the first reader-antenna so that the first and the second reading fields have substantially the same orientations.

The two readers can do the exact same function and both can be controlled by the independent centralized unit 6, for example by a personal computer with appropriate software.

Furthermore, the first and second reader can be synchronized with respect to their reading field and/or reading activities.

According to a further approach, an interpretation of lost or added objects during the course by reading with multiple stations is possible. For example, objects can fall off or persons can remove objects, etc.

Figure 10:
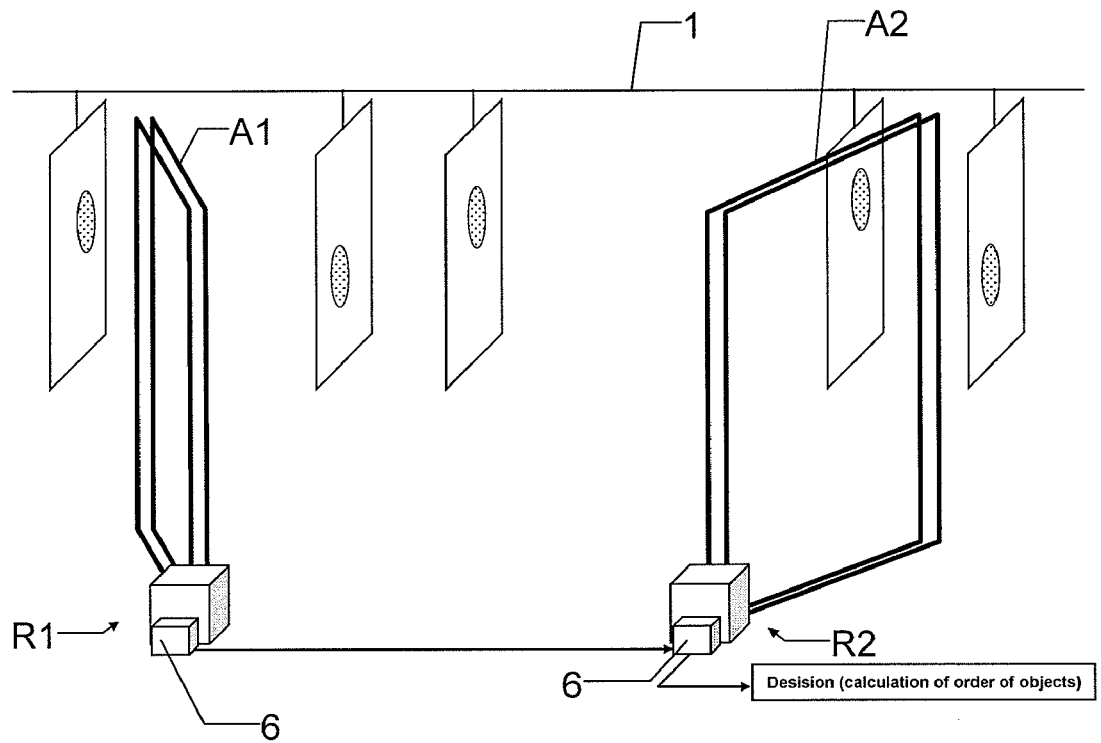
FIG. 10 shows a serial configuration of the first and second reader with two decentralized computing units.

FIG. 10 shows a serial configuration of the first and second reader R1,R2 with two decentralized computing units 6.

The readers are connected in chain. Therefore, the second reader R2 can use prior knowledge through the data gathered by the first reader R1 to take the decisions regarding the order of the objects.

Particularly, the information regarding the order derived by the first reader R1 can be used as prior information by the second reader R2 to re-assess or verify the order of the objects.

In this embodiment, the computing unit 6 is decentralised and comprises two computing parts, one thereof being assigned to the first reader R1 and the other being assigned to the second reader R2. Furthermore, the second reader-antenna is arranged tilted with respect to the first reader-antenna, so that the orientations of the first and the second reading fields are different. In other words, the antennas of the multiple reading stations are placed in various angles with respect to the movement axis to improve reading of various physical orientations of the objects respectively the transponders on the objects.

According to a further embodiment, the first and/or the second antenna can also be designed as multi-dimensional antennas and/or multi-phase antennas, particularly consisting of two loops which have a predetermined phase relationship of their transmission signals.

Although the invention has been illustrated above, partly with reference to some preferred embodiments, it must be understood that numerous modifications and combinations of different features of the embodiments can be made.

The invention claimed is:

1. Method for determining of at least an order of objects transported by a conveyor along a conveyor path, wherein
   each of the objects carries an assigned transponder having a characterizing code and
   at least a first radio frequency identification reader—having at least a first reader-antenna for generating a first reading field—is arranged with respect to the conveyor and built for identifying the transponders of the transported objects passing along or through the first reading field,
with the steps of
   reading out the codes of the transponders by the first reader and generating detection-signals as long as the respective transponder is detectable by the first reader,
   saving the detection-signals linked with a time information,
   deriving a mean first point of time for each detected transponder from the saved detection-signals and the time information linked therewith by an assessment method, wherein the first points of time indicate an estimated discrete point of time for each transponder of passing the first reader, and
   determining the order of the objects on the conveyor according to the first points of time of each transponder.

2. Method according to claim 1,
wherein
the assessment method is performed by
   determining an entering time and a leaving time of the detection range for each transponder using the saved detection-signals and
   calculating the arithmetic average of the entering and the leaving times as the first points of time.

3. Method according to claim 1,
wherein the detection-signals are generated with a constant or variable reading-rate, particularly with a reading rate being dependant on the conveyor velocity.

4. Method according to any of claims 1,
wherein the actual conveyor velocity is assigned to each detection-signal, wherein the actual conveyor velocity is known or measured by a velocity sensor.

5. Method according to claim 4,
wherein considering the conveying-velocity linked with the detection-signals for deriving the first points of time, in particular wherein
   the assessment method is performed by
      weighting each time information of the detection-signals with the corresponding conveying-velocity and
      calculating a weighted mean point of time as the first point of time for each transponder, and/or
   the assessment method is performed by deriving a travelling distance of each transponder through the first reading field from the saved detection-signals and the conveying-velocity linked therewith, deriving that point of time when the transponder passed the half of the travelling distance from the respective detection-signals as the first point of time.

6. Method according to claim 5,
wherein
using multiple different assessment methods for deriving multiple first points of time for each transponder and selecting the most appropriate first point of time for each transponder for determining the order, in particular by using a maximum likelihood approach, especially by using knowledge of a type of the objects carrying the transponders as this influences the spatial orientation of the transponders relative to the first reader antenna (A1) and thus the detection range of each transponder.

7. Method according to claim 6,
wherein positions of the objects on the conveyor are derived from the calculated first points of time.

8. Method according to claim 7,
wherein
the first reading field is confined by shielding areas on the conveyor path before and/or behind the first reader-antenna—in particular by means of a metallic and/or ferrite material for magnetic fields and dielectric materials for electric fields.

9. Method according to claim 8,
wherein
a second radio frequency identification reader—having at least a second reader-antenna for generating a second reading field—is arranged for reading out the codes of the transponders transported through the second reading field, particularly wherein the first and second readers are synchronized with respect to their reading fields, and in that the further steps are performed
generating additional detection-signals as long as the respective transponder is detectable by the second reader,
saving the additional detection-signals linked with a time information, and
further using the additional detection-signals linked with the time information for determining the order.

10. Method according to claim 9,
wherein
deriving a mean second point of time for each detected transponder from the respective additional detection-signals according to any assessment method of claims 1 to 6 and
determining the order of the objects using the first and the second points of time, particularly using an average of the first and the second points of time of each transponder.

11. Method according to claim 10,
wherein
the second reader-antenna is arranged parallel with respect to the first reader-antenna so that the first and the second reading fields have substantially the same orientations, or
the second reader-antenna is arranged tilted with respect to the first reader-antenna so that the orientations of the first and the second reading fields are different.

12. Method according to claim 11,
wherein
manipulating the orientation of the objects before the first and/or the second reader.

13. Method according to claim 12,
wherein
the objects are only positioned on fixed predetermined—particularly equidistant—places of the conveyor, especially wherein the objects are placed on hooks or slots of the conveyor, and
an allocation information of the objects to the predetermined places on the conveyor is derived from the detection-signals of each transponder,
in particular wherein a beam interruption detector detects the presence of an object on the respective predetermined places, and
in particular wherein the determined order and/or the allocation information are provided to a further system for processing of the objects, especially to a sorting machine.

14. Device for determination of at least an order of objects transported by a conveyor along a conveyor path, wherein the objects carry transponders having a characterizing code,
the device comprising
at least a first radio frequency identification reader—having a first reader-antenna for generating a first reading field—being arranged and formed for
identifying the transponders of the objects transported through the first reading field by reading out the codes of the transponders and
a generating detection-signals as long as the respective transponder is detectable, and
a computing unit formed for
a saving the detection-signals linked with a time information,
a deriving a mean first point of time for each detected transponder from the saved detection-signals and the time information linked therewith by an assessment method according to any of claims 1 to 6, wherein the first point of time indicates an estimated discrete point of time for each transponder of passing the first reader, and
a determining the order of the objects on the conveyor according to the first points of time of each transponder.

15. Device according to claim 14,
wherein
a velocity sensor for measuring and providing an actual conveyor velocity, wherein the computing unit is formed for
assigning the measured actual conveyor velocity to each detection-signal and
considering the conveyor velocity linked with the detection-signals for determining the order,
particularly wherein the first reader reads out and generates the detection-signals with a reading rate being dependant on the conveyor velocity.

16. Device according to claim 14,
wherein
a second radio frequency identification reader—having a second reader-antenna for generating a second reading field—being arranged and formed for
identifying the transponders of the objects transported through the second magnetic field by reading out the codes of the transponders, and
generating additional detection-signals as long as the respective transponder is detectable, and in that the computing unit is formed for
saving the additional detection-signals linked with a time information, and
further using the additional detection-signals linked with the time information for determining the order.

17. Device according to claim 16,
wherein
the second reader-antenna is arranged parallel with respect to the first reader-antenna so that the first and the second reading fields have substantially the same orientations or
the second reader-antenna is arranged tilted with respect to the first reader-antenna so that the orientations of the first and the second reading fields are different.

18. Device according to claim 16,
wherein
the first and/or the second antenna is a multi-dimensional antenna and/or a multi-phase antenna, particularly consisting of two loops which have a determined phase relationship of their transmission signals.

* * * * *